(12) United States Patent
Fong et al.

(10) Patent No.: US 11,721,095 B2
(45) Date of Patent: *Aug. 8, 2023

(54) MACHINE LEARNING FOR QUANTUM MATERIAL SYNTHESIS

(71) Applicant: RAYTHEON BBN TECHNOLOGIES CORP., Cambridge, MA (US)

(72) Inventors: Kin Chung Fong, Cambridge, MA (US); Man-Hung Siu, Lexington, MA (US); Zhuolin Jiang, Cambridge, MA (US)

(73) Assignee: RAYTHEON BBN TECHNOLOGIES CORP., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,815

(22) Filed: Nov. 22, 2022

(65) Prior Publication Data

US 2023/0091882 A1    Mar. 23, 2023

Related U.S. Application Data

(63) Continuation of application No. 16/420,100, filed on May 22, 2019, now Pat. No. 11,537,822.

(60) Provisional application No. 62/675,728, filed on May 23, 2018.

(51) Int. Cl.
| | |
|---|---|
| *G06V 10/82* | (2022.01) |
| *G06N 3/04* | (2023.01) |
| *C01B 32/19* | (2017.01) |
| *G06F 18/24* | (2023.01) |
| *G06V 20/69* | (2022.01) |

(52) U.S. Cl.
CPC .............. *G06V 10/82* (2022.01); *C01B 32/19* (2017.08); *G06F 18/24* (2023.01); *G06N 3/0418* (2013.01); *G06V 20/698* (2022.01)

(58) Field of Classification Search
CPC ....... G06F 18/24; G06N 3/0418; G06V 10/82
See application file for complete search history.

(56) References Cited

U.S. PATENT DOCUMENTS

| | | | |
|---|---|---|---|
| 11,537,822 B2 * | 12/2022 | Fong | ...................... G06V 10/82 |
| 2018/0322660 A1 | 11/2018 | Smith | |
| 2021/0173188 A1 | 6/2021 | Johnson et al. | |

OTHER PUBLICATIONS

Masubuchi, Satoru et al., "Autonomous robotic searching and assembly of two-dimensional crystals to build van der Waals superlattices", Nature Communications, Apr. 12, 2018, pp. 1-12.

* cited by examiner

*Primary Examiner* — Phuoc Tran
(74) *Attorney, Agent, or Firm* — Lewis Roca Rothgerber Christie LLP

(57) ABSTRACT

A method for classifying images of oligolayer exfoliation attempts. In some embodiments, the method includes forming a micrograph of a surface, and classifying the micrograph into one of a plurality of categories. The categories may include a first category, consisting of micrographs including at least one oligolayer flake, and a second category, consisting of micrographs including no oligolayer flakes, the classifying comprising classifying the micrograph with a neural network.

20 Claims, 9 Drawing Sheets

| Class | Training | Validation |
|-------|----------|------------|
| MLG   | 236      | 100        |
| BLG   | 146      | 71         |
| NONE  | 702      | 351        |

*FIG. 4*

MACHINE LEARNING FOR QUANTUM MATERIAL SYNTHESIS

CROSS-REFERENCE TO RELATED APPLICATION(S)

This is a continuation U.S. application Ser. No. of 16/420,100, filed May 22, 2019, which claims priority to and the benefit of U.S. Provisional Application No. 62/675,728, filed May 23, 2018, entitled "MACHINE LEARNING FOR QUANTUM MATERIAL SYNTHESIS", the contents of all of which are incorporated by reference in their entirety herein.

FIELD

One or more aspects of embodiments according to the present invention relate to oligolayer structures, and more particularly to a system and method for assessing processes for forming oligolayer flakes.

BACKGROUND

Research in material science may involve labor-intensive trial-and-error approaches to fabricate, characterize, test, measure materials, and evaluate the material quality in a device-level setting. Except for advances of fabrication technology, e.g., miniaturization, modern material science may still require, like it did a century ago, researchers' tireless efforts to first zero in on a specific recipe and to study any candidate solution thoroughly, over an extended period of time, before transitioning to larger scale manufacturing. Because fabrication processes may require several steps, the total time taken can grow geometrically depending on the yield of each procedure.

There are numerous commercial applications for thin (e.g., monolayer or bilayer) flakes of material, such as monolayer or bilayer flakes of graphene or of other suitable materials, including quantum information processing systems, transistors, Josephson junctions, and sensitive bolometers, and, therefore, for systems and methods for forming such thin flakes. Thus, there is a need for an improved system and method for assessing the performance of candidate methods for forming thin (e.g., monoloyer or bilayer) flakes of material.

SUMMARY

According to an embodiment of the present invention, there is provided a method for classifying images, the method including: forming a micrograph of a surface; and classifying the micrograph into one of a plurality of categories, the categories including: a first category, consisting of micrographs including at least one oligolayer flake, and a second category, consisting of micrographs including no oligolayer flakes, the classifying including classifying the micrograph with a neural network.

In some embodiments, the micrograph is a visible optical micrograph.

In some embodiments, the first category includes: a third category, consisting of micrographs including at least one monolayer flake and a fourth category micrographs consisting of micrographs including at least one bilayer flake.

In some embodiments, the neural network is a residual neural network.

In some embodiments, the neural network is a convolutional neural network.

In some embodiments, the neural network is a neural network selected from the group consisting of ResNet18, ResNet152, ResNet101, ResNet50, and ResNet34.

According to an embodiment of the present invention, there is provided a method for classifying exfoliation methods, the method including: performing an exfoliation attempt using a candidate exfoliation method, the performing of the exfoliation attempt resulting in products of the exfoliation attempt on a surface of a substrate; forming a micrograph of the surface of the substrate; and classifying the micrograph into one of a plurality of categories, the categories including: a first category, consisting of micrographs including at least one oligolayer flake, and a second category, consisting of micrographs including no oligolayer flakes, the classifying including classifying the micrograph with a neural network.

In some embodiments, the micrograph is a visible optical micrograph.

In some embodiments, the first category includes: a third category, consisting of micrographs including at least one monolayer flake and a fourth category micrographs consisting of micrographs including at least one bilayer flake.

In some embodiments, the neural network is a residual neural network.

In some embodiments, the neural network is a convolutional neural network.

In some embodiments, the neural network is a neural network selected from the group consisting of ResNet18, ResNet152, ResNet101, ResNet50, and ResNet34.

According to an embodiment of the present invention, there is provided a system for classifying attempts to form oligolayer flakes, the system including: a processing circuit, the processing circuit being configured to run a neural network to classify each of a plurality of micrographs of a surface of a substrate into one of a plurality of categories, the categories including: a first category, consisting of micrographs including at least one oligolayer flake, and a second category, consisting of micrographs including no oligolayer flakes.

In some embodiments, the system further includes a microscope fitted with a digital camera, for obtaining digital micrographs of a surface below the microscope.

In some embodiments, the system further includes a translation stage under the microscope.

In some embodiments, the processing circuit is further configured to control the translation stage and the digital camera to generate the plurality of micrographs.

In some embodiments, each of the plurality of micrographs is a visible optical micrograph.

In some embodiments, the first category includes: a third category, consisting of micrographs including at least one monolayer flake and a fourth category micrographs consisting of micrographs including at least one bilayer flake.

In some embodiments, the neural network is a residual neural network.

In some embodiments, the neural network is a convolutional neural network.

BRIEF DESCRIPTION OF THE DRAWINGS

Features, aspects, and embodiments are described in conjunction with the attached drawings, in which:

FIG. 4 is table of set sizes, according to an embodiment of the present invention;

DETAILED DESCRIPTION

Figure 1:
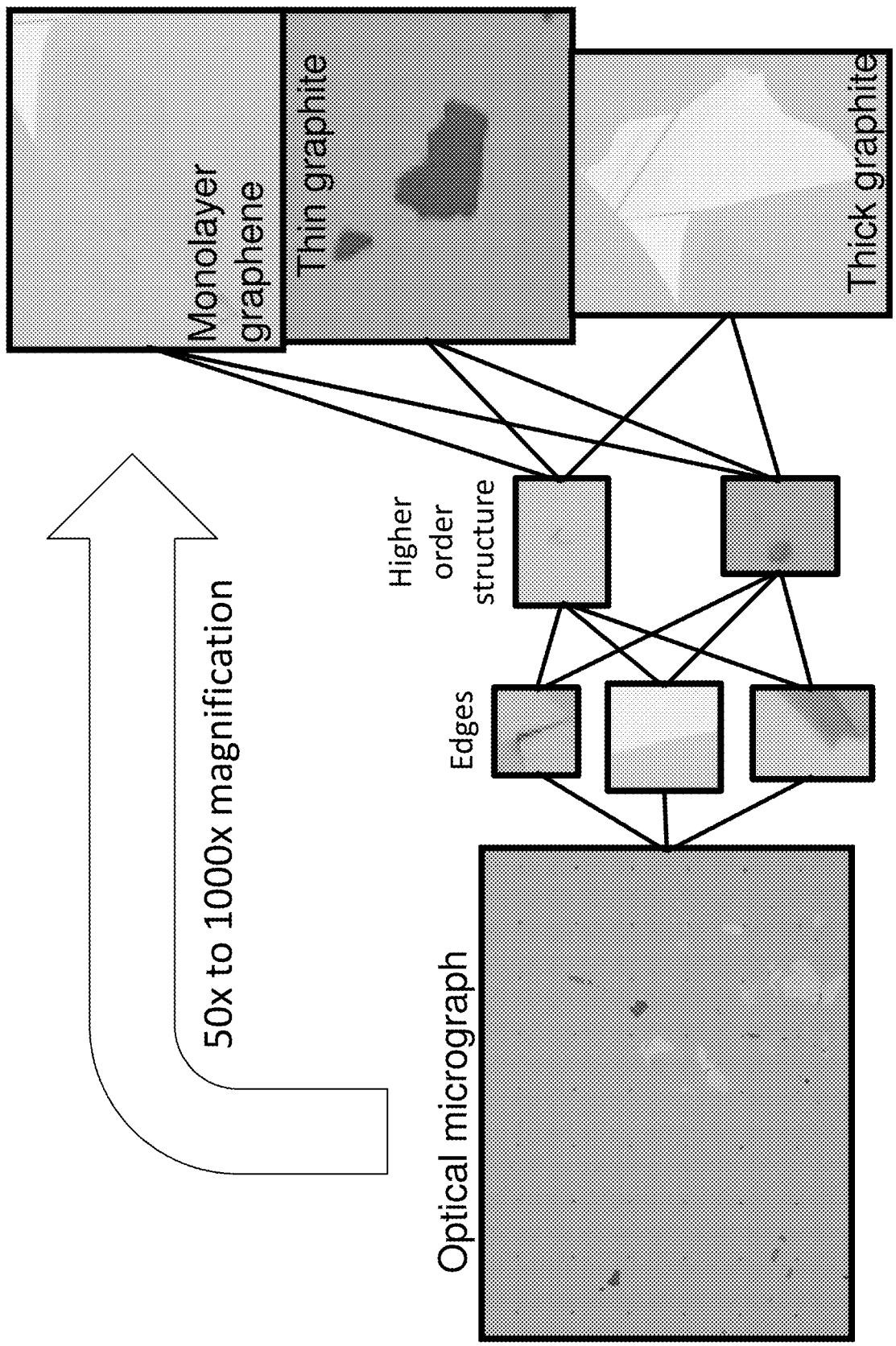
FIG. 1 is a hybrid schematic process micrograph chart, according to an embodiment of the present invention.

The detailed description set forth below in connection with the appended drawings is intended as a description of exemplary embodiments of a system and method for assessing processes for forming oligolayer flakes provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Monolayer structures (such as flakes of monolayer graphene (MLG)), bilayer structures (such as flakes of bilayer graphene (BLG)), and other oligolayer structures, or "oligolayer flakes" may be useful for constructing elements of quantum systems. Oligolayer flakes of graphene have been shown to be useful in such applications. Other materials may also be capable of forming oligolayer flakes. In particular, materials that are composed of crystalline sheets held together only by Van der Waals forces may be well suited for forming oligolayer flakes. Examples of such materials may include GaSe, BP, CdS, CdSe, and BN. Exfoliation attempts may be made with any such material to assess its suitability as a source material for the forming of oligolayer flakes. As used herein, an oligolayer structure or an "oligolayer flake" of a material is a sample of the material in the form of a thin sheet, the sheet having a thickness of at most six atomic layers.

The process of forming, or attempting to form, oligolayer flakes may include a plurality of steps, one or more of which may have parameters that may be varied. As such, the parameter space of candidate exfoliation processes may be large. As used herein, a "candidate exfoliation process" is a process suspected of being capable of forming oligolayer flakes from a suitable material. An "exfoliation process" for a material is a process that has been demonstrated to be capable of forming oligolayer flakes from a sample of the material.

One process that is an exfoliation process for graphene, and that may be a candidate exfoliation process for other layered materials, is an adhesive tape process, also known as a "scotch tape method". In such a process, a crystalline grown layered material may be mechanically exfoliated to thin layers by repeatedly cleaving a sample of the layered material using the adhesive tape as a handler. The layer material is then transferred onto a substrate, which may be a silicon wafer, by stamping the adhesive tape with the thin layer material onto the substrate. The stamping process may involve rubbing the adhesive tape gently against the substrate and peeling it off slowly. After the stamping process, some oligolayers of the layered material may be transferred onto the substrate. The presence of oligolayer flakes of the layered material transferred onto the substrate and the thicknesses of any such flakes may depend on the thickness of the layered material originally on the adhesive tape, as well as the details of the mechanical exfoliation process, such as the pressure applied in stamping and speed of the peeling. Flakes of the layered material of various thicknesses, size, and shape (as well as contaminants, such as dirt or adhesive) may be found on the substrate after the stamping process.

Analyzing the surface of the substrate to assess the efficacy of a exfoliation attempt (e.g., by determining whether oligolayer flakes are present) may be burdensome, as discussed in further detail below, and the adjusting of parameters of an exfoliation process (to identify parameters resulting in a high rate of success) may involve many such analyses, one for each set of parameters being tested. Moreover, identifying new materials suitable for forming monolayer flakes (such as monolayers of graphene), bilayer flakes or other oligolayer flakes, and finding processes for forming such flakes may be yet more burdensome because it may involve testing each of a number of candidate materials with each of several candidate exfoliation processes. As such, a significant effort may be involved, because of the large number of candidate materials, the multiple candidate exfoliation processes for forming oligolayer flakes from a bulk sample of the material, and the difficulty of assessing the effectiveness of forming oligolayer flakes with any combination of material and exfoliation process.

As the term is used herein, a "flake" need not be separated from other flakes, and a portion of a flake is itself a flake. For example, a thin sheet of material a portion of which has a thickness of two atomic layers over a portion of its area and a thickness of ten atomic layers over the remainder of its area may be considered, using the terminology employed herein, to consist of (i) an oligolayer flake and (ii) a flake that is too thick to be considered an oligolayer flake. Similarly, a sample in the form of a thin sheet of material, which has a thickness of one atomic layer over a portion of its area and a thickness of two atomic layers over the remainder of its area may be considered, using the terminology employed herein, to consist of a single oligolayer flake, or of (i) a monolayer flake and (ii) a bilayer flake.

Referring to FIG. 1, in some embodiments, a micrograph of a surface of a substrate upon which are the products of an exfoliation attempt may include flakes of various thicknesses, e.g., if graphite was the substance with which the exfoliation attempt was made, flakes of thick graphite 105, flakes of thin graphite 110, and oligolayer flakes (e.g. monolayer flakes) of graphite 115. The surface of the substrate may also include (as mentioned above) contaminants (e.g., dust or other dirt), and residual adhesive from the exfoliation process. An exfoliation attempt may generate products of the exfoliation attempt over a region, or "region of interest", of the surface of the substrate having, for example, an area of one square centimeter (e.g., a square area one centimeter on a side). A plurality of micrographs of the surface (e.g., each covering an area of about 224 pixels by 224 pixels, may then be taken, together covering the region of interest of the surface. The micrographs may overlap slightly, or there may be slight gaps between adjacent micrographs.

The micrographs of the surface of the substrate may be obtained by moving the substrate laterally under a microscope equipped with a digital camera, and periodically taking micrographs (e.g., while the substrate is stopped). Between consecutive micrographs, the substrate may be moved by about the width of a micrograph, so that every point on the surface appears in one of the micrograph, and so that only a relatively small fraction of the surface of the substrate appears in more than one micrograph. The obtaining of the micrographs may be performed manually, by a human operator (e.g., an operator viewing the output of the camera on a display, manually translating the substrate between exposures, and taking a new exposure (i.e., a new micrograph) after each time that the substrate is displaced.

In other embodiments, a sequence of micrographs of the surface of the substrate may be obtained in an automated manner by mounting the substrate on a suitable translation stage, e.g., an X-Y translation stage equipped with motorized micrometers on both of its axes. The motorized micrometers may include stepper motors or servo motors, making possible the control of these motors by a processing circuit (discussed in further detail below) connected to suitable motor drive circuitry, to effect commanded displacements, of the substrate, in two transverse directions. The processing circuit may then command a sequence of displacements causing each portion of the surface of the substrate to fall, in turn, within the field of view of the camera, and after each displacement, the processing circuit may command the camera to take a micrograph, so that a sequence of micrographs together covering the region of interest of the surface of the substrate is obtained.

The large number of micrographs that may be obtained from a surface containing the products of an exfoliation attempt may then be analyzed by a human operator trained to recognize oligolayer flakes. The effort of performing such an analysis of the products of an exfoliation attempt for the presence of oligolayer flakes may be significant, and in some embodiments is performed by a neural network instead of being performed by a human, as discussed in further detail below.

Figure 2A:
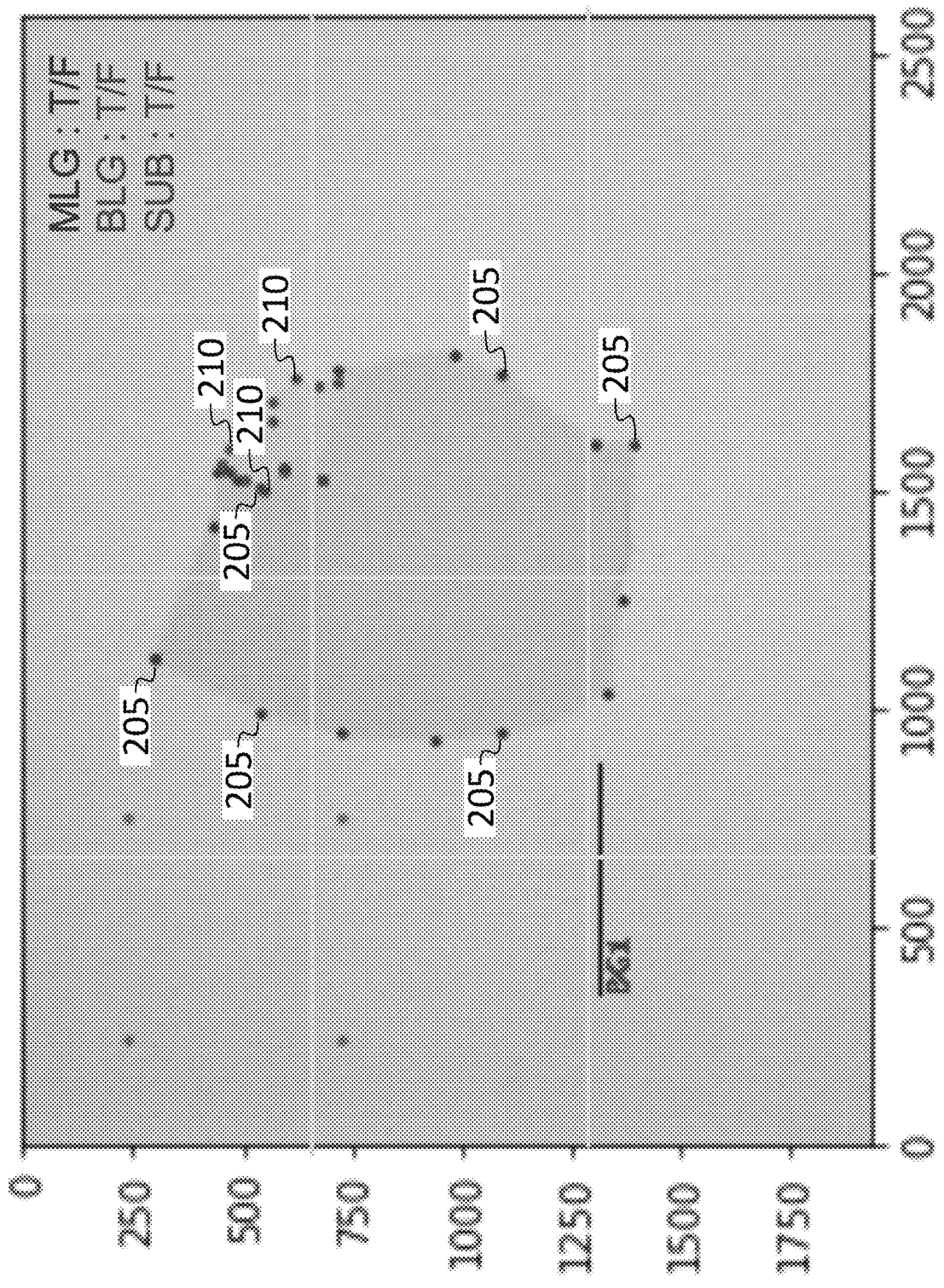
FIG. 2A is an annotated micrograph, according to an embodiment of the present invention.

In some embodiments, a plurality of micrographs may be analyzed by one or more human operators and annotated with human-identified characteristics, for use in training a neural network, so that the neural network may subsequently perform analysis of similar micrographs. FIG. 2A shows an example of a graphically annotated micrograph, in which a human operator has placed a first plurality of dots 205 on the boundary of a bilayer flake of graphene, and a second plurality of dots 210 on the boundary of a monolayer flake of graphene.

Figure 2B:
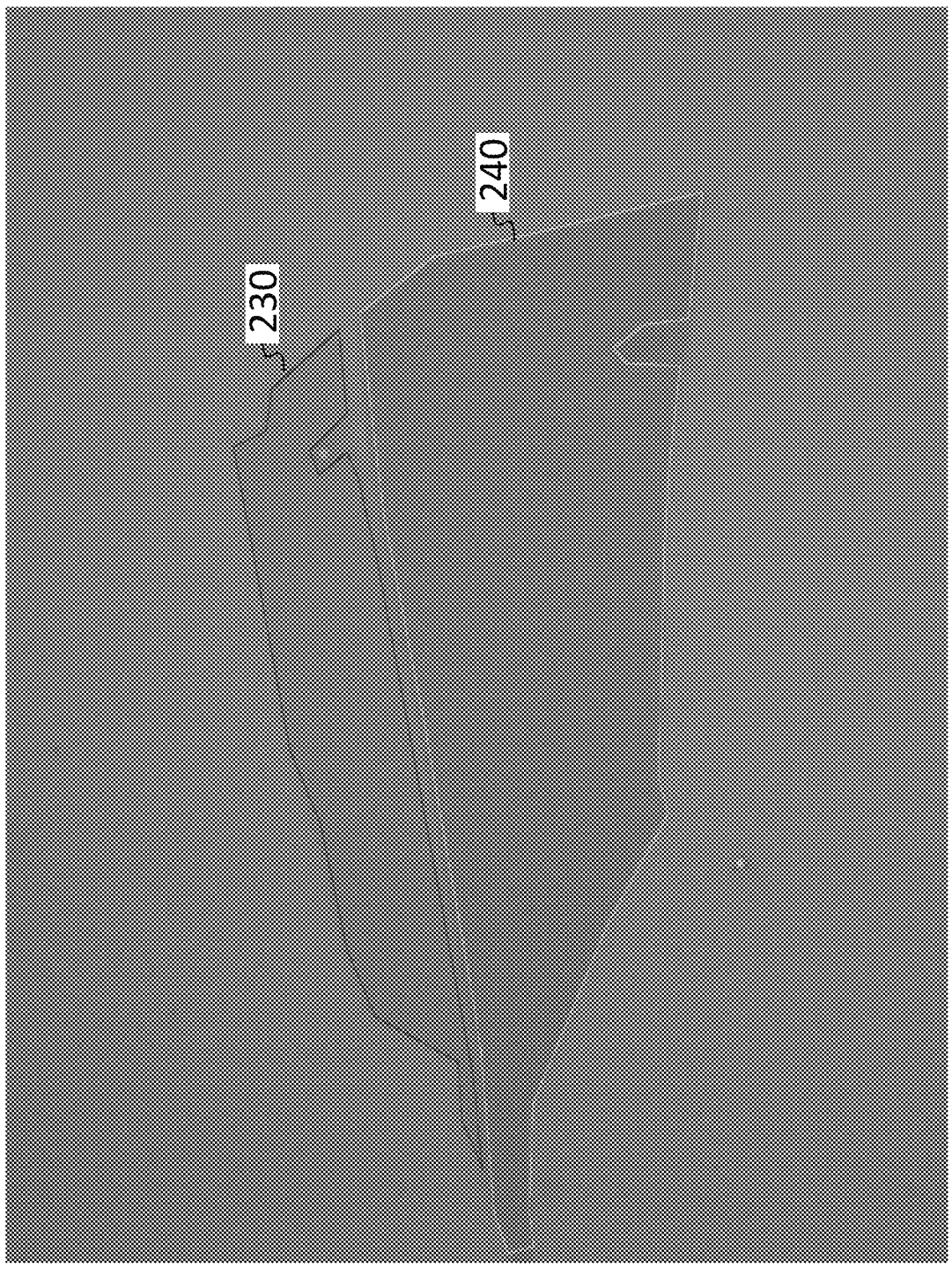
FIG. 2B is an annotated micrograph, according to an embodiment of the present invention.

FIG. 2B shows a similar result of a classification performed by a human operator, with the boundaries of monolayer graphene and bilayer graphene flakes being approximated by piecewise linear curves (e.g., a first curve 230 containing a monolayer flake of graphene, and a second curve 240 containing a bilayer flake of graphene), each having been formed by connecting vertices identified by the human operator.

Figure 3:
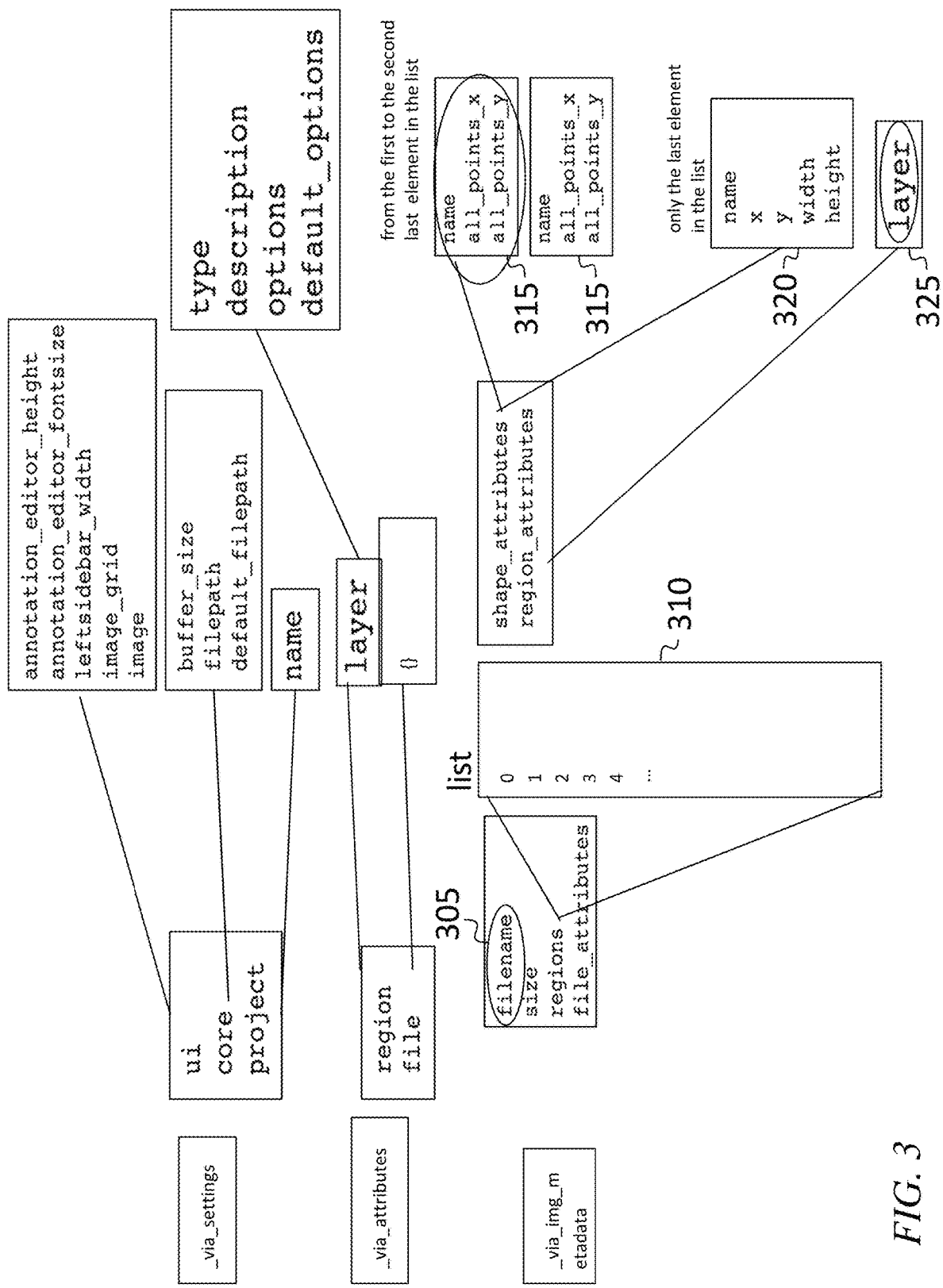
FIG. 3 is data structure graph, according to an embodiment of the present invention.

FIG. 3 shows a JavaScript Object Notation (JSON) data structure that may be used to store the results of classifying images. Each image may be identified by a file name 305, and may include a list 310 of shapes. Each shape may be associated with a list of elements, of which all but the last may be points defining the boundary of the shape (e.g., as in FIGS. 2A and 2B) and of which the last element 320 may also include the width and the height of the shape. An additional attribute of the shape may be its thickness 325, which may have a value of, e.g., one for a monolayer flake, two for a bilayer flake, and so forth.

The table of FIG. 4 shows set sizes for an exemplary reduction to practice. 1606 micrographs resulting from an exfoliation attempt with graphene were classified by human operators into three categories: micrographs with monolayer graphene flakes ("MLG" in the table of FIG. 4) (of which there were 336), micrographs with bilayer graphene flakes and no monolayer graphene flakes ("BLG" in the table of FIG. 4) (of which there were 217), and micrographs with no bilayer graphene flakes and no monolayer graphene flakes ("NONE" in the table of FIG. 4) (of which there were 1053). Each of these sets was further divided into a portion for a training set and a portion for a validation set as shown in the table of FIG. 4.

Supervised training of a neural network was then performed with the training set, and the performance of the trained neural network was assessed using the validation set. During validation, which was used to measure and demonstrate the proper functioning of the neural network, the neural network classified each micrograph according to whether it contained oligolayer flakes. In particular, the neural network classified each micrograph into one of a plurality of categories, the categories including a first category, consisting of micrographs including at least one oligolayer flake, and a second category, consisting of micrographs including no oligolayer flakes. The first of these categories included two categories (or "sub-categories"): a third category, consisting of micrographs including at least one monolayer flake, and a fourth category consisting of micrographs including at least one bilayer flake. As used herein, a group of categories is itself a "category" and a portion of a "category" is also a "category".

Figure 5:
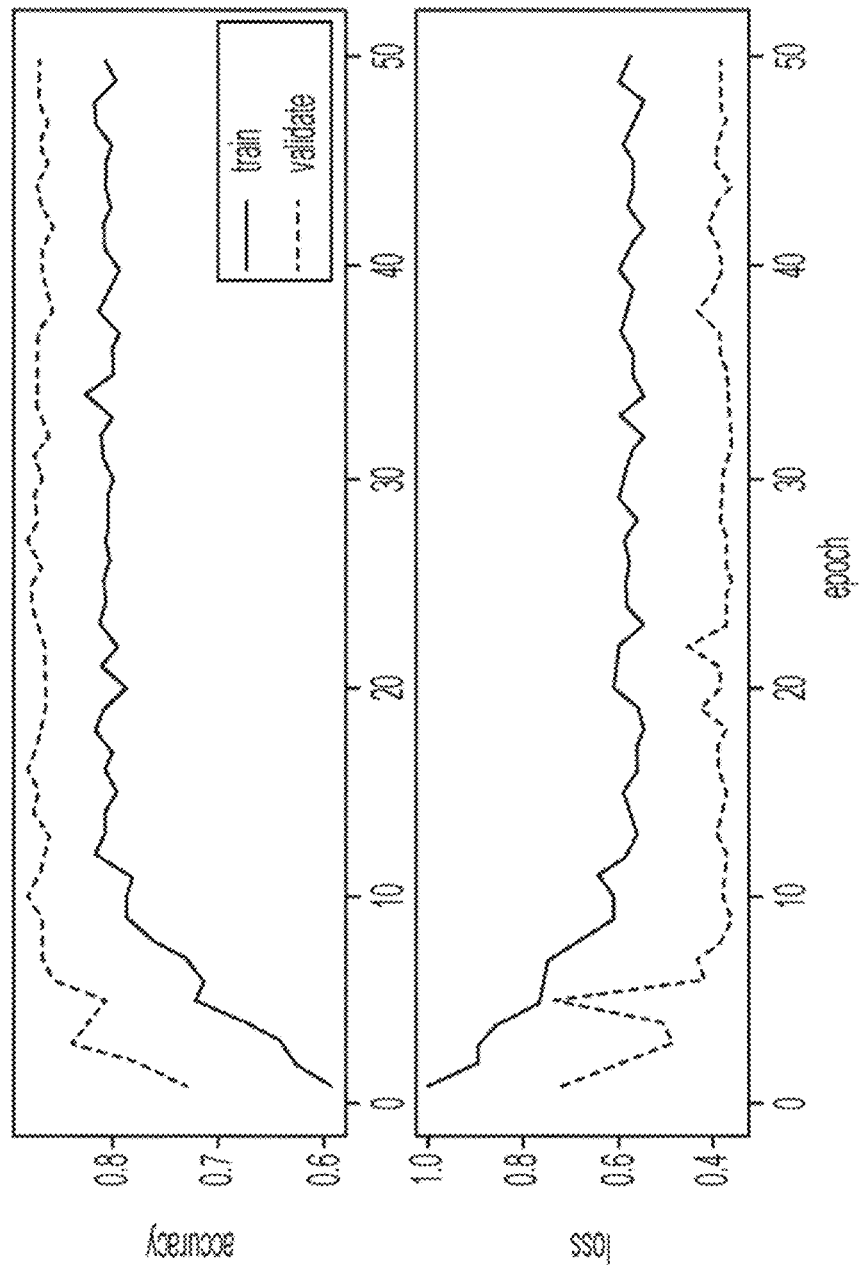
FIG. 5 is a training convergence graph, according to an embodiment of the present invention.
Figure 6A:
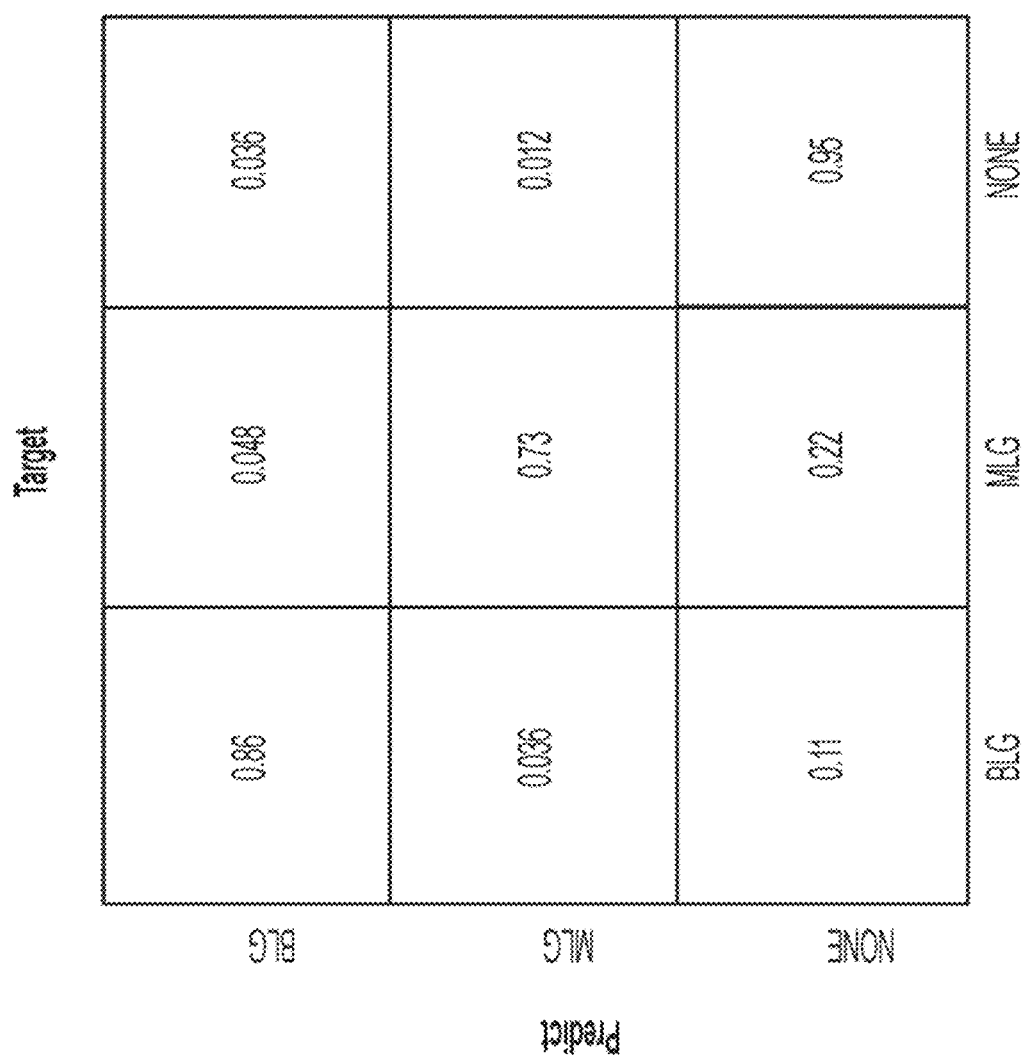
FIG. 6A is a confusion matrix, according to an embodiment of the present invention.
Figure 6B:
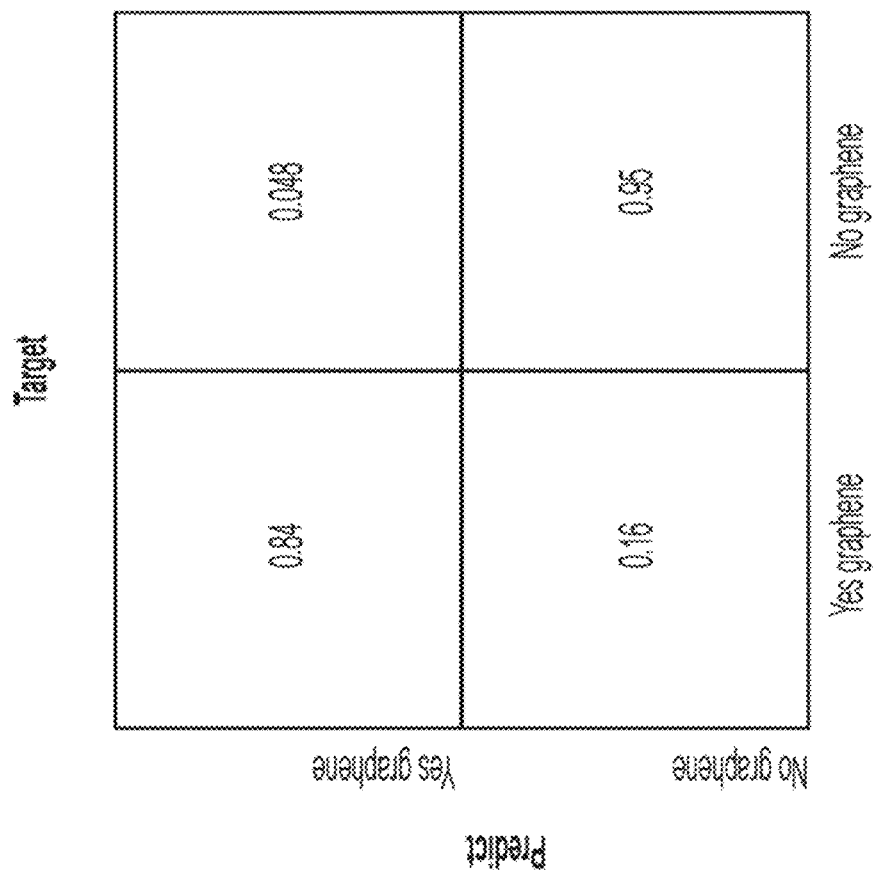
FIG. 6B is a confusion matrix, according to an embodiment of the present invention.

FIG. 5 shows the convergence of accuracy and loss, as a function of epoch, using ResNet18 (a residual convolutional neural network), where epoch measures the number of iterations of back propagation. FIGS. 6A and 6B show confusion matrices for the classifier of FIG. 5. It may be seen from FIG. 6A that the classifier correctly identifies micrographs having bilayer graphene flakes 86% of the time, it correctly identifies micrographs having monolayer graphene flakes 73% of the time, and it correctly identifies micrographs having no graphene flakes 95% of the time. The confusion matrix of FIG. 6B combines the MLB and BLG categories into a single category labeled "Yes graphene"; it can be seen that the classifier correctly identifies micrographs having either a bilayer graphene flake or a monolayer graphene flake 84% of the time.

Figure 7:
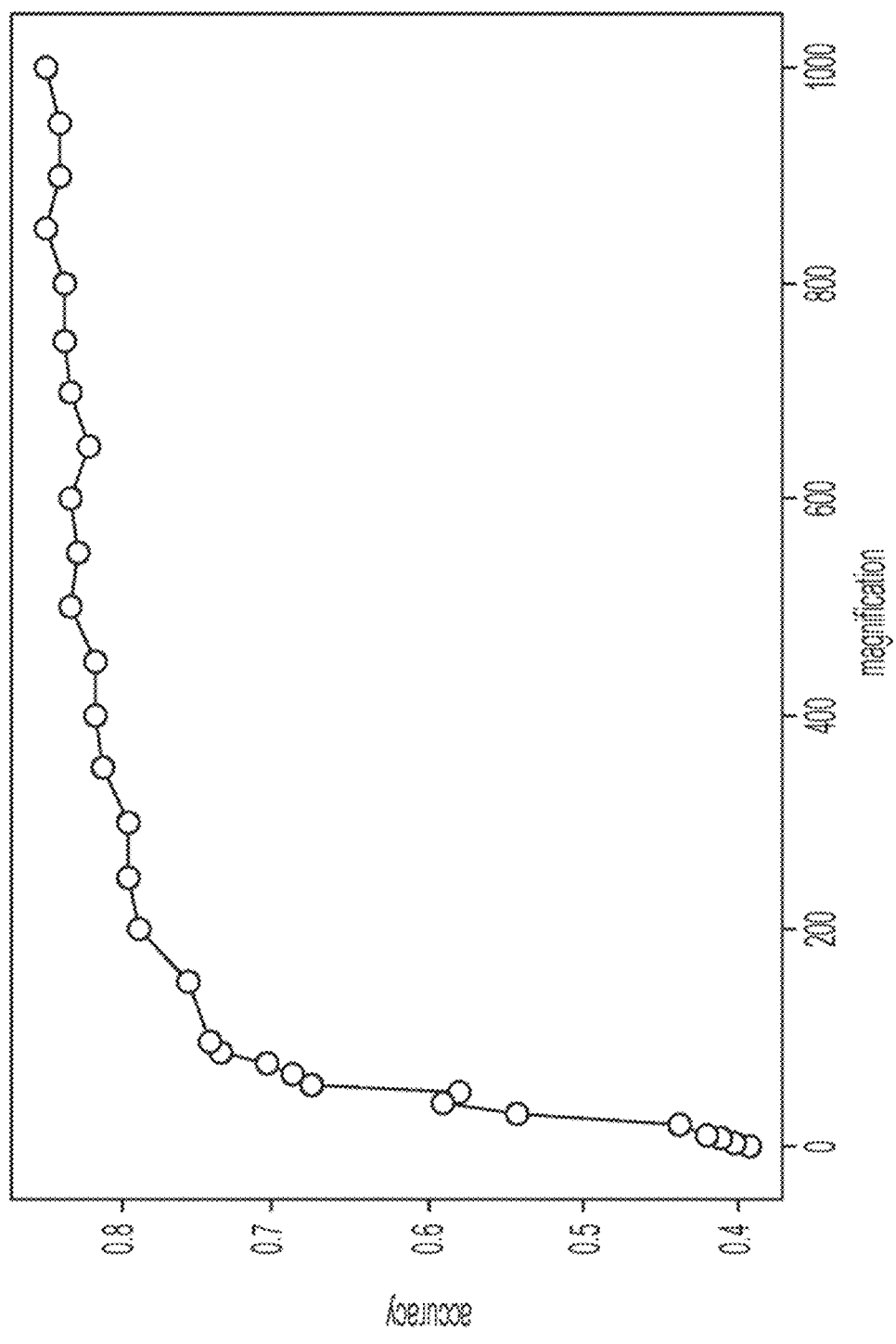
FIG. 7 is a graph of accuracy as a function of magnification, according to an embodiment of the present invention.

The results of FIGS. 5-6B were obtained using a set of micrographs obtained at 1000× magnification. FIG. 7 shows the accuracy of a classifier when lower magnification (than 1000× magnification) is employed, as a function of the magnification (simulated, to generate the graph of FIG. 7, by resampling micrographs previously obtained with a magnification of 1000×). It may be seen from FIG. 7 that the magnification may be reduced by a factor of more than two without a significant loss of accuracy. Using lower magnification may make it possible to cover a given (e.g., 1 cm square) surface using fewer micrographs, making it possible to process such samples significantly more quickly. For example, a reduction by a factor of two in magnification may result in a reduction by a factor of four in the number of micrographs required to cover a given substrate area, and, accordingly, a reduction by a factor of four in the time required to analyze the results of an exfoliation attempt.

In some embodiments, the neural network is implemented on a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Although limited embodiments of a system and method for assessing processes for forming oligolayer flakes have been specifically described and illustrated herein, many modifications and variations will be apparent to those skilled in the art. Accordingly, it is to be understood that a system and method for assessing processes for forming oligolayer flakes employed according to principles of this invention may be embodied other than as specifically described herein. The invention is also defined in the following claims, and equivalents thereof.

What is claimed is:

1. A method for classifying images, the method comprising:
    forming a micrograph of a surface; and
    classifying the micrograph into one of a plurality of categories, the categories including:
        a first category, consisting of micrographs including at least one monolayer flake, and
        a second category, consisting of micrographs including at least one bilayer flakes, and
    the classifying comprising classifying the micrograph with a neural network.

2. The method of claim 1, wherein the micrograph is a visible optical micrograph.

3. The method of claim 1, wherein the first category includes:
    a third category, consisting of micrographs including at least one oligolayer flake and
    a fourth category micrographs including no oligolayer flakes.

4. The method of claim 1, wherein the neural network is a residual neural network.

5. The method of claim 1, wherein the neural network is a convolutional neural network.

6. The method of claim 1, wherein the neural network is a neural network selected from the group consisting of ResNet18, ResNet152, ResNet101, ResNet50, and ResNet34.

7. A method for classifying exfoliation methods, the method comprising:
    performing an exfoliation attempt using a candidate exfoliation method, the performing of the exfoliation attempt resulting in products of the exfoliation attempt on a surface of a substrate;
    forming a micrograph of the surface of the substrate; and
    classifying the micrograph into one of a plurality of categories, the categories including:
        a first category, consisting of micrographs including at least one monolayer flake, and
        a second category, consisting of micrographs including at least one bilayer flakes,
    the classifying comprising classifying the micrograph with a neural network.

8. The method of claim 7, wherein the micrograph is a visible optical micrograph.

9. The method of claim 7, wherein the first category includes:
    a third category, consisting of micrographs including at least one oligolayer flake and
    a fourth category micrographs including no oligolayer flakes.

10. The method of claim 7, wherein the neural network is a residual neural network.

11. The method of claim 7, wherein the neural network is a convolutional neural network.

12. The method of claim 7, wherein the neural network is a neural network selected from the group consisting of ResNet18, ResNet152, ResNet101, ResNet50, and ResNet34.

13. A system for classifying attempts to form oligolayer flakes, the system comprising:
    a processing circuit,
    the processing circuit being configured to run a neural network to classify each of a plurality of micrographs of a surface of a substrate into one of a plurality of categories, the categories including:
        a first category, consisting of micrographs including at least one monolayer flake, and
        a second category, consisting of micrographs including at least one bilayer flakes.

14. The system of claim 13, further comprising a microscope fitted with a digital camera, for obtaining digital micrographs of a surface below the microscope.

15. The system of claim 14, further comprising a translation stage under the microscope.

16. The system of claim 15, wherein the processing circuit is further configured to control the translation stage and the digital camera to generate the plurality of micrographs.

17. The system of claim 16, wherein each of the plurality of micrographs is a visible optical micrograph.

18. The system of claim 16, wherein the first category includes:
    a third category, consisting of micrographs including at least one oligolayer flake and
    a fourth category micrographs including no oligolayer flakes.

19. The system of claim 16, wherein the neural network is a residual neural network.

20. The system of claim 16, wherein the neural network is a convolutional neural network.

* * * * *